March 24, 1931.   C. E. HARRISON   1,798,019
EXTENSION GRATE
Filed Oct. 6, 1925   6 Sheets-Sheet 1
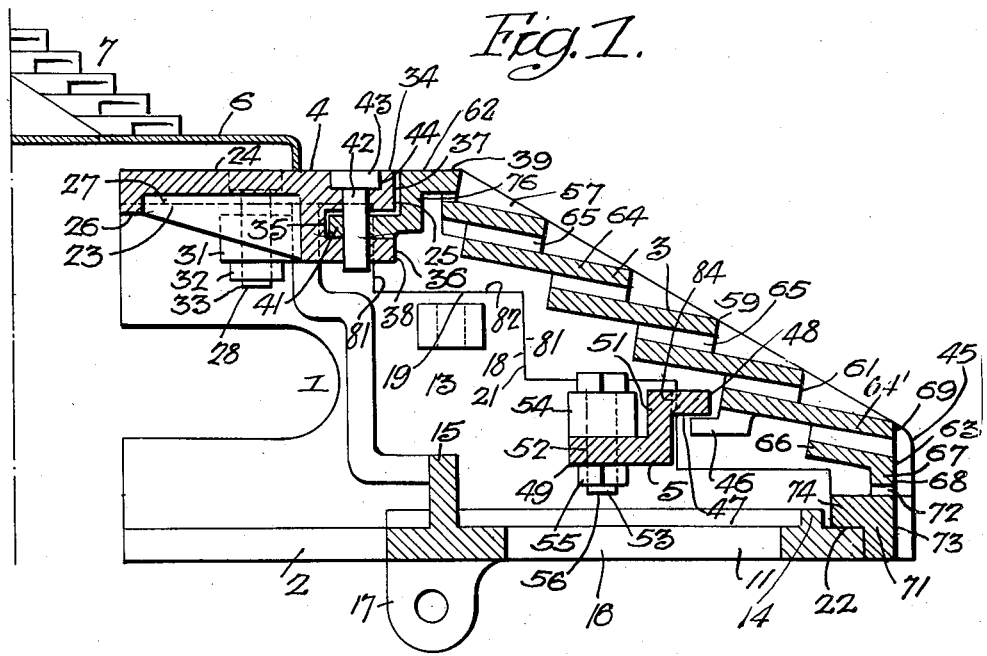
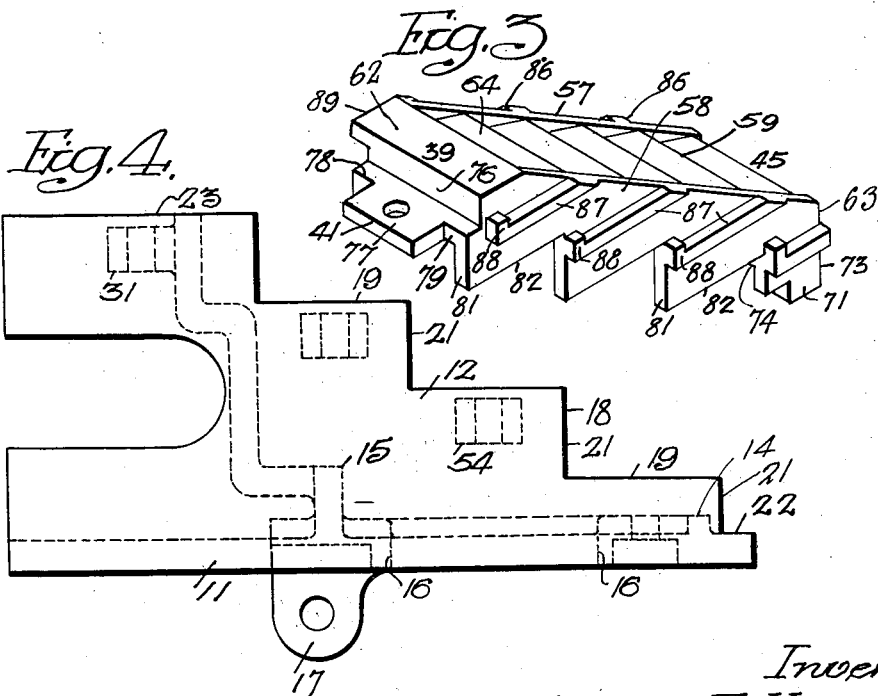
Inventor—
Clifford E. Harrison.
by his Attorneys.—
Howson & Howson

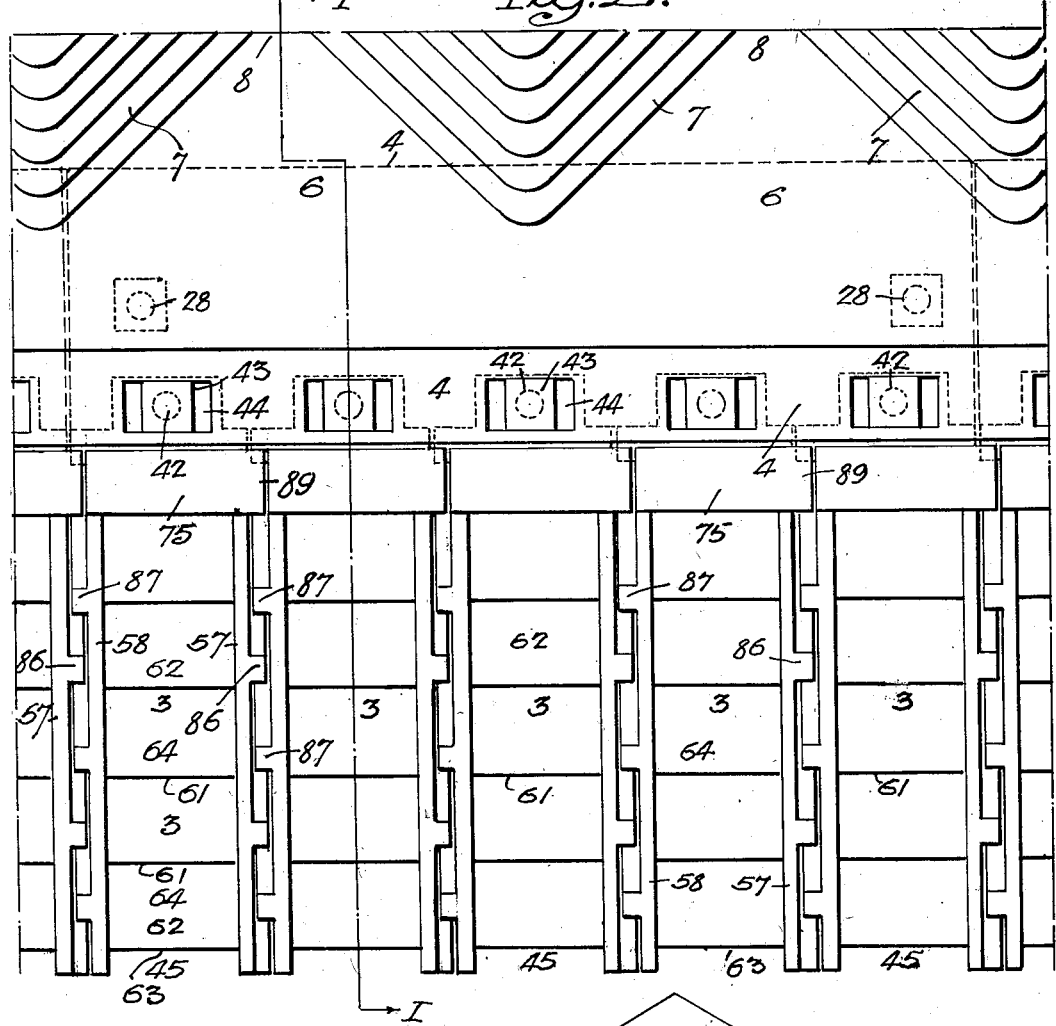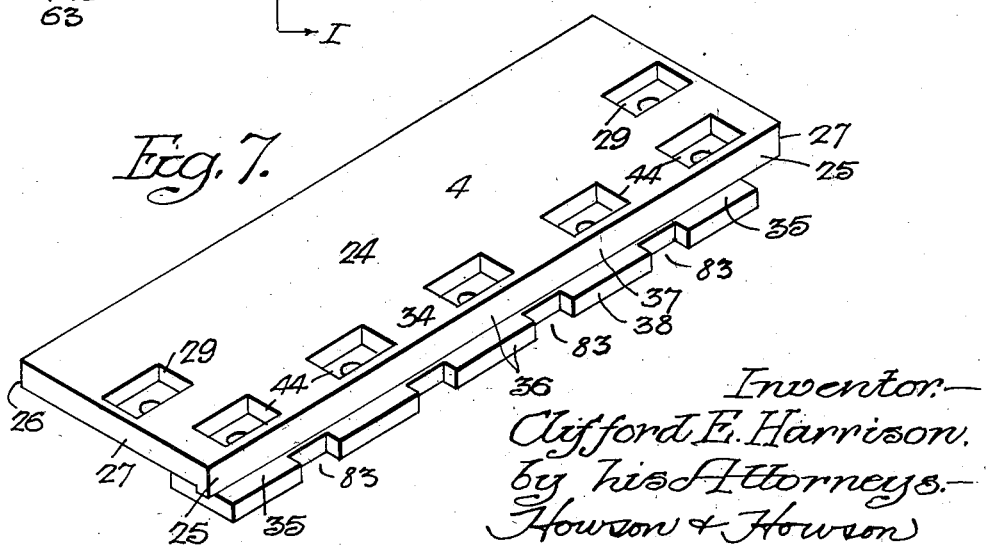

March 24, 1931. C. E. HARRISON 1,798,019
EXTENSION GRATE
Filed Oct. 6, 1925   6 Sheets-Sheet 3
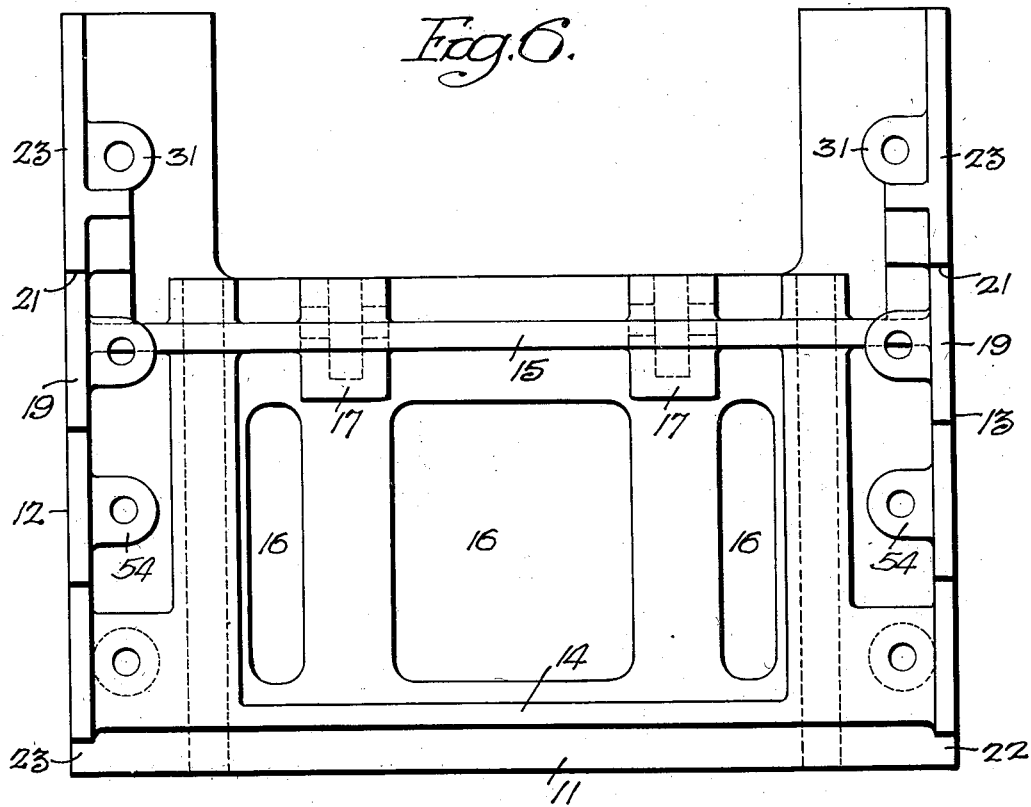
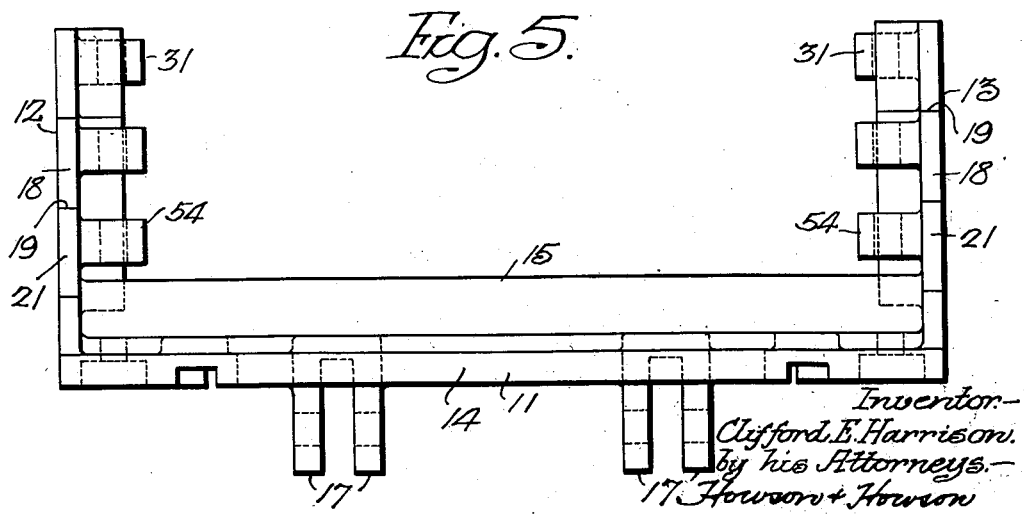

March 24, 1931.  C. E. HARRISON  1,798,019
EXTENSION GRATE
Filed Oct. 6, 1925   6 Sheets-Sheet 4

Inventor:-
Clifford E. Harrison.
by his Attorneys:-
Howson & Howson

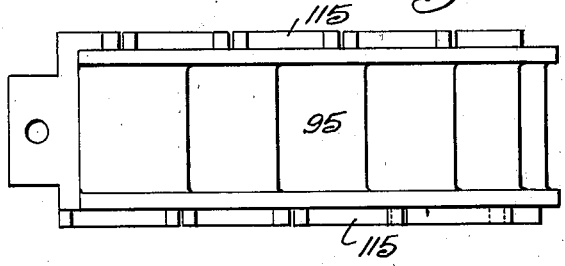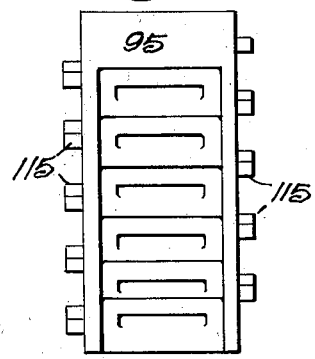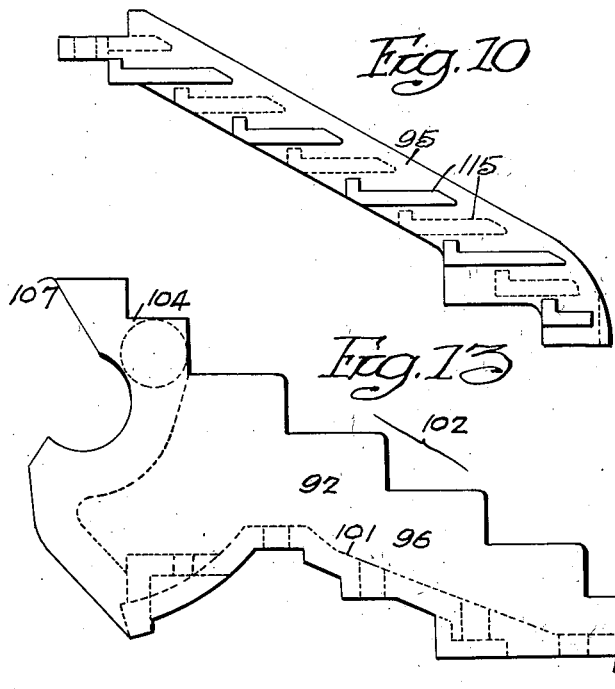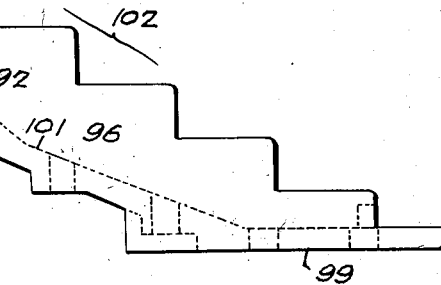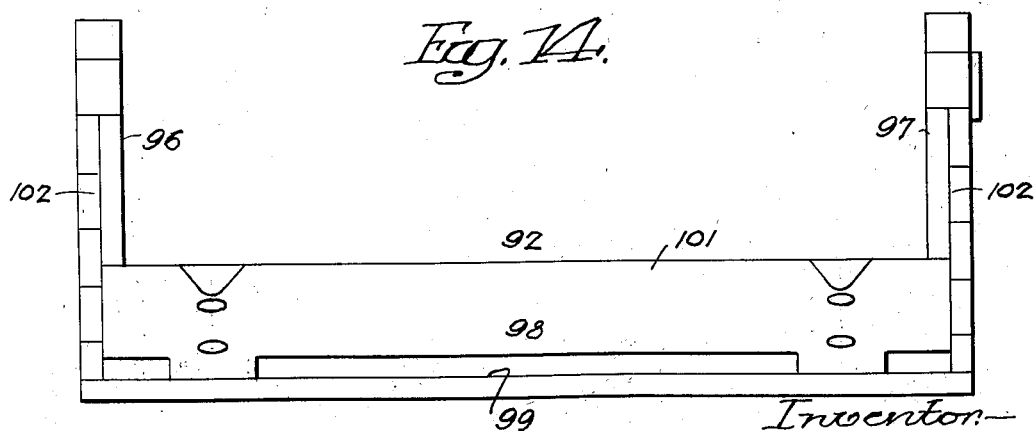

March 24, 1931.　　　C. E. HARRISON　　　1,798,019
EXTENSION GRATE
Filed Oct. 6, 1925　　　6 Sheets-Sheet 6
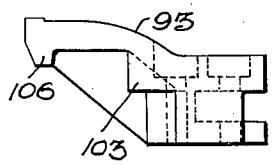
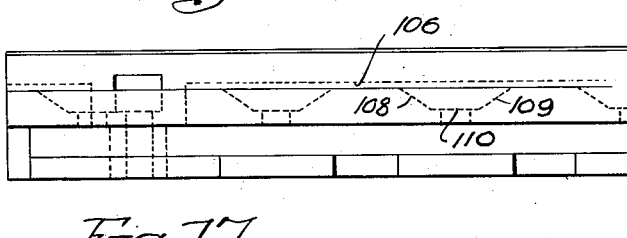
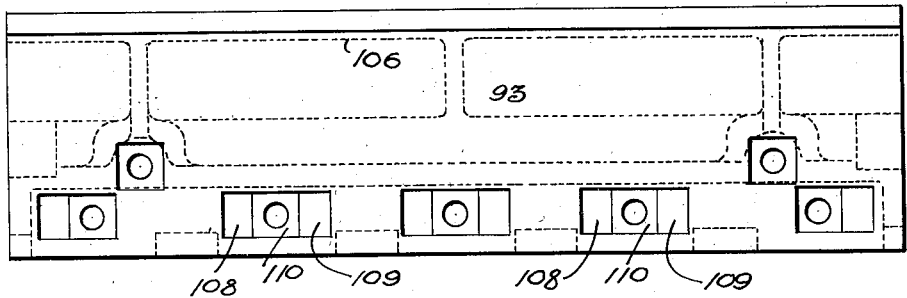
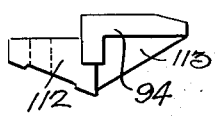
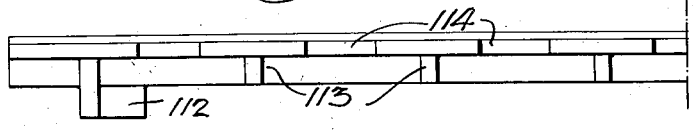
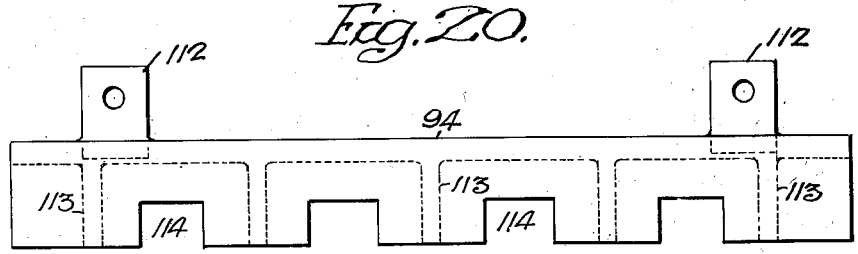

Patented Mar. 24, 1931

1,798,019

UNITED STATES PATENT OFFICE

CLIFFORD E. HARRISON, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA

EXTENSION GRATE

Application filed October 6, 1925. Serial No. 60,878.

My invention relates to stokers, having particular relation to extension grates.

One object of my invention is to provide an extension grate that shall be characterized by simplicity and ease of renewing damaged grate bars without in any way disturbing adjacent bars.

Another object of my invention is to provide an extension grate, wherein the operating linkage may be reached simply by removing an extension grate bar.

A further object of my invention is to provide apparatus of the class described that shall have a maximum area of cooling surface, the air supply passages being designed to prevent the sifting of material therethrough.

A still further object of my invention is to provide a reinforced grate bar designed to prevent warping and breakage under extraordinary operating conditions.

A still further object of my invention is to provide an extension grate comprising a frame having a base and side walls, a grate plate and a grate bar stop supported by said side walls, and a plurality of removable grate bars, adjacent sides of which are provided with interspaced ribs adapted to prevent the sifting of material therebetween and to provide air outlet passages.

Other objects and applications of my invention, as well as details of construction and operation, whereby my invention may be practiced, will be apparent more fully hereinafter, when taken in connection with the accompanying drawings, wherein—

Fig. 1 is a detail longitudinal sectional view of an extension grate embodying my invention, the sectional plane being taken on the line I—I of Fig. 2;

Fig. 2 is a plan view of the structure of Fig. 1;

Fig. 3 is a view in perspective of one of the grate bars;

Figs. 4 and 5 are side and end elevational views, respectively, of the supporting frame;

Fig. 6 is a plan view of the structure of Figs. 4 and 5;

Fig. 7 is a perspective view of the grate top-plate;

Figs. 10 and 11 are side and end elevational views, respectively, of the grate bar illustrated in Figs. 8 and 9;

Fig. 12 is a top plan view of the grate bar of Figs. 10 and 11;

Figs. 13 and 14 are side and end elevational views, respectively, of the grate frame of Figs. 8 and 9;

Figs. 15 and 16 are side and end elevational views, respectively, of the grate top-plate embodied in the modified form of my invention;

Fig. 17 is a top plan view of the structure shown in Figs. 15 and 16;

Figs. 18 and 19 are side and end elevational views, respectively, of the grate bar stop embodied in the modification; and Fig. 20 is a top plan view of the structure illustrated in Figs. 18 and 19.

Figure 8:
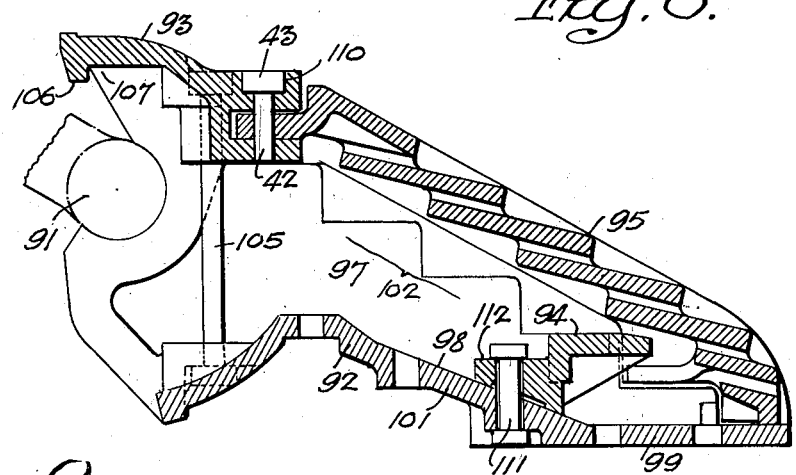
Figs. 8 and 9 are views similar to Figs. 1 and 2 but illustrating an alternative embodiment of my invention.
Figure 9:
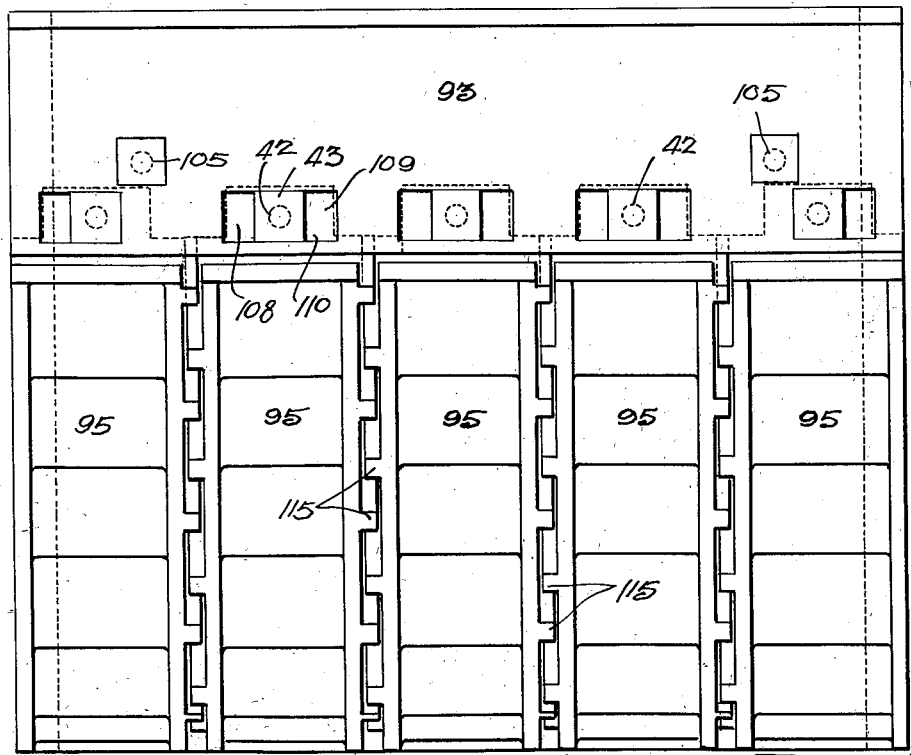

In the embodiment of my invention shown in Figs. 1 to 7, inclusive, an extension grate 1 comprises broadly a horizontally reciprocal frame 2, a plurality of grate bars 3, a grate top-plate 4 and a grate bar stop or retaining bar 5. The usual stoker mechanism associated with the extension grate 1 has not been shown except a dead plate 6 and alternating series of tuyères 7 and retorts 8.

The horizontally reciprocal frame 2, of which Figs. 4, 5 and 6 are detail views, comprises a base portion 11 and side walls 12 and 13. The base 11 is provided with a transversely extending, stiffening rear rib 14 and a similar intermediate rib 15. Intermediate the ribs 14 and 15, the base 11 is provided with openings 16 for the reception of air under pressure. The portion of the base 11 in front of the intermediate stiffening rib 15 is also removed to lighten the frame 9 as well as to afford an additional air opening. Pairs of apertured lugs 17, which depend from the underside of the base 11 immediately adjacent to the stiffening rib 15, are designed to be connected to the grate operating mechanism (not shown).

A rear edge 18 of each side wall is of step-like form comprising horizontal and vertical portions 19 and 21, respectively. The lower vertical portion 21 is spaced from the rear edge of the base 11 sufficient to form a horizontal shoulder portion 22. The upper vertical portion 21 terminates in an elongated edge 23. The grate top-plate 4 (Figs. 1 and 7) comprises an elongated member 24 having depending rear and front flanges 25 and 26 and end flanges 27. The latter flanges are designed to rest on the upper side wall edges 23, whereby the grate top-plate 4 may be mounted on the frame 2 in the position shown in Fig. 1.

Movement of the grate top-plate 4 may be prevented by means of a pair of bolts 28 which respectively extend through countersunk perforations 29 in the opposite ends of the grate top-plate 4 into apertured lugs 31 respectively formed on the inner surface of the side walls 12 and 13. A nut 32, which engages a threaded end 33 of the bolt 28 extending beyond the lug 31, serves to secure the grate top-plate 4 rigidly in position. The grate top-plate 4 is normally so positioned with respect to the dead plate 6 that a rear portion 34 extends beyond the same. The depending top-plate flange 25 is provided with a groove 35 in a rear side 36 formed between upper and lower lips 37 and 38, respectively. The lip 37 constitutes part of the rear end portion 34 which extends beyond the dead plate 6.

Each of the grate bars 3 has an upper end 39 provided with a tongue 41 which extends into the groove 35, whereby said upper end may be supported and locked against undesirable vertical movement. Horizontal movement of each grate bar 3 relative to the frame 2 may be prevented by a locking pin 42, which extends through aligned apertures in the upper and lower lips 37 and 38 and the tongue 41. An enlarged head portion 43 of each locking pin 42 may be positioned in a countersunk portion 44 of the aperture in the upper lip 37, so as to be flush with the upper surface of the grate top-plate 4.

A lower end 45 of each grate bar 3 is supported by the shoulder 22 and it is prevented from moving vertically by means of a projecting lug 46, which engages an underside 47 of the horizontal flange portion 48 of the grate bar stop 5. The horizontal portion 48 is connected to a second horizontal portion 49 by means of a vertical portion 51, said horizontal portion 49 being provided with apertures 52 at the ends adapted to receive bolts 53 carried by lugs 54 formed on the inner surface of the vertical walls 12 and 13. A nut 55 may be mounted on the lower threaded end 56 of each of the bolts 53 and it serves to clamp the horizontal portion 49 of the grate bar stop 5 rigidly in engagement with the lug 54.

Considering each grate bar 3 in detail, as illustrated in Figs. 1 and 3, it comprises a pair of side walls 57 and 58 and a rear grate surface 59. The grate surface 59 comprises an inclined portion 61 which terminates at its upper end in a horizontal portion 62 and at its lower end in a vertical portion 63. The intermediate inclined portion 61 may comprise a plurality of spaced overlapping plates 64 which extend between the side walls 57 and 58, forming a corresponding plurality of air outlet passages 65. The overlapping plates 64 are inclined upwardly to prevent the sifting of material through said air passages 65. Such construction also affords a maximum cooling surface and the resulting lower temperature of the bars causes an increase in the life thereof.

A plate 66 (Fig. 1) in the lower end 45 of the grate bar 3 is not projected beyond an overlapping plate 64' immediately above the same, as in the preceding overlapping plates 64, but it is provided with a depending flange 67, a rear side 68 of which is in vertical alignment with a rear edge 69 of said upper plate 64'. The flange 67 may be spaced from a base portion 71 to provide an additional air outlet passage 72 in the lower end 45 of the grate bar 3. The base portion 71 extends between the side walls 57 and 58, as in the case of the overlapping plates 64 and 66, and it has a rear side 73 in vertical alignment with the side 68 of the flange 67. A shoulder 74 is also formed on the base portion 71 for engagement with the shoulder 22, whereby the lower end of the grate bar 3 may be suitably supported.

As particularly shown in Fig. 1, the upper horizontal portion 62 of the grate surface 59 terminates in a vertical depending wall portion 76. The horizontal tongue portion 41 is projected from the vertical wall portion 76 at a point below the horizontal portion 62, and it is provided with a portion 77 of reduced width, forming shoulders 78 and 79 at the sides thereof. As aforementioned, the tongue 41 is apertured to receive the removable locking pin 42, whereby the grate bar 3 may be locked against outward horizontal movement relative to the frame 2.

The side walls 57 and 58 of the grate bar 3 are of step-like construction, having vertical and horizontal edges 81 and 82 adapted to fit the rear and top edges 18 and 19, respectively, of the frame 2. The lower lip 38 of the grate top plate 4 is provided with a plurality of recesses or notches 83 in the rear edge thereof, as illustrated particularly in Fig. 7. These recesses are adapted to receive the vertical edges 81 of the grate bar side walls 57 and 58 when the tongue 41 is inserted in the groove 35. That is to say, each recess 83 receives the edges 81 of the adjacent grate bars 3 and thereby prevents lateral movement with respect to the frame 2. The lower end 45 of each of the grate bars 3 may be similarly secured against lateral movement by recesses or notches 84 in the horizontal flange portion 48 of the grate bar stop 5. As previously noted, vertical movement of this end of the grate bar 3 is prevented by the lug 46 which extends from the underside of one of the overlapping sections or plates 64.

My invention also contemplates stiffening means for the grate bars 3, said means also functioning to prevent the entrance of siftings between the sides 57 and 58 of adjacent grate bars 3, as well as to form a plurality of air outlet passages. To this end, I provide each of the walls 57 and 58 with a series of upwardly inclined ribs 86 and 87, respectively, the ribs of one series alternating with those of the other, so that the ribs of adjacent sides of successive grate bars are interspaced. Each rib extends upwardly from the front edge of one of the side walls 57—58 and terminates in an enlarged head portion 88, whereby the tendency for siftings to pass between the grate bars 3 may be further decreased. The horizontal portion 62 of the grate surface 59 is provided on one side with a projecting portion 89 adapted to overhang the ribs on the adjacent side of the next grate bar 3. The interlocking construction above described thus insures a free flow of air as well as preventing the passage of siftings between adjacent grate bars 3. The ribs further serve to strengthen the bars 3 and thus lengthen the life thereof.

When one of the grate bars 3 is damaged, the locking pin 42 is removed and said bar moved rearwardly in a horizontal direction until the tongue 41 and the lug 46 are disengaged from the grate top plate 4 and the grate bar stop 5, respectively, whereupon the damaged bar 3 may be lifted to permit the replacement of a new bar.

My invention further embodies a slightly modified construction, wherein the extension grate is rocked about a shaft 91 rather than moved horizontally as in the previous embodiment of my invention. The present construction comprises broadly a grate frame 92, a grate top-plate 93, a grate bar stop 94 and a plurality of grate bars 95, as illustrated in Figs. 8 to 18, inclusive.

Considering the grate frame 92 in detail (Figs. 13 and 14) a pair of side walls 96 and 97 extend vertically from a base portion 98, the latter comprising a substantially flat rear portion 99 and an inclined forwardly extending portion 101. The side walls 96 and 97 comprise upwardly inclined edges 102 of step-like form.

The grate top-plate 93, of which Figs. 8, 15, 16 and 17 are detail views, is very similar to the grate top plate 4 of the previous modification, the principal difference being in the provision of end flanges 103 adapted to fit upper portions 104 of the side wall edges 102, as illustrated in Fig. 8. A further distinction is in the clamping bolts 105 which extend through the hollow portion of the frame 92 to the base 98. The front edge of the grate top-plate 93 may also be provided with a depending flange 106 for engagement with upper edges 107 of the side walls 96 and 97, so as to insure further the rigid positioning of the grate top plate 93 on the grate frame 92. Countersunk portion 110 for receiving head 43' of a locking pin 42' is provided with beveled sides 108 and 109, whereby the removal of the locking pin 42' may be facilitated.

Figs. 18, 19 and 20 illustrate the grate stop bar 94. The function of this bar is identical with that of the preceding construction and it differs only in constructional details. The grate bar stop 94 may be secured in position by bolts 111 which extend up through the inclined portion 101 of the base into projecting lugs 112 carried by said grate bar stop. The grate bar stop 94 is also provided with a plurality of stiffening ribs 113 which are positioned intermediate recesses or notches 114 adapted to receive the side walls of the grate bar 95.

The grate bar 95, of which Figs. 10, 11 and 12 are detail views, is distinguishable over that of Fig. 3 only in the detail construction thereof. The grate bar 95 includes a plurality of spaced ribs 115, the ribs on one side alternating with those on the other and interlocking with the ribs on adjacent bars. The sides of the grate bars in alignment with the frame side walls 96 and 97 may not be provided with the ribs 115 due to the fact that the grate frame 92 rocks rather than slides as in the preceding embodiment. The fundamental methods of locking the grate bars 95 against vertical, horizontal and lateral movements are broadly the same as set forth in the description of Figs. 1 to 7, inclusive, so that a further detail discussion is deemed unnecessary.

While I have shown only two embodiments of my invention, for the purpose of describing the same and illustrating its principles of construction and operation, it is apparent that various changes and modifications may be made therein without departing from the spirit of my invention, and I desire, therefore, that only such limitations shall be imposed thereon as are indicated in the appended claims or as are demanded by the prior art.

I claim:

1. In an extension grate structure, a grate top-plate provided with a groove in one side forming upper and lower lips, the lower lip having a plurality of recesses in the edge thereof, and a grate bar having side walls respectively disposed in successive recesses, whereby undesirable lateral movement of the bar may be avoided.

2. In a device of the class described, a grate top-plate provided with a groove in one side forming upper and lower lips, the lower lip having a plurality of recesses in the edge thereof, a grate bar having side walls respectively disposed in successive recesses, whereby undesirable lateral movement of the bar may be avoided, said grate bar being also provided with a tongue projecting into said groove, and means for securing said tongue in position.

3. A grate top-plate provided with a groove in one side forming spaced upper and lower portions, a plurality of apertures formed in one of said portions extending into said groove, a plurality of notches formed in the edge of one of said portions, and a plurality of grate bars, each grate bar having side walls respectively disposed in successive notches, and each of said grate bars also having a projecting apertured tongue positioned in said slot in operative relation to one of said apertures, and locking pins extending through said apertures and retaining the said tongues in the slot.

4. A grate top-plate having a substantially flat upper surface and a groove in one side forming upper and lower lips, the upper lip being provided with a plurality of apertures permitting locking pins to be inserted therethrough into said groove, and a grate bar having side and front walls, one portion of the front wall being inclined and having a plurality of air openings, another portion being in substantial alignment with said upper surface, said last-mentioned portion having a projecting tongue extending into said groove and apertured for the reception of said bolt.

5. A movable frame having a base, a grate top-plate, said plate having one side so grooved as to form spaced upper and lower lips, the upper lip having an aperture extending into said groove adapted to receive a locking pin, a grate bar having a lower end mounted on said base and an upper end provided with an apertured tongue disposed in said groove, and retained therein by said locking pin which enters the said aperture of said tongue, a grate bar stop, and a locking lug extending from said grate bar into operative relation to said grate bar stop.

6. A grate structure comprising a grate-bar frame having a base and side walls, at least one of said side walls being of step-like form, a grate bar having a side wall adapted to fit said last-mentioned frame side wall so as to be supported thereon, a grate bar top-plate mounted on said frame side walls and extending therebetween, and a retaining bar also extending between said frame side walls, said grate bar being locked by said grate bar top-plate and said retaining bar against movement in two directions.

7. A grate structure comprising a grate bar frame including a top plate and a retaining bar, said plate and bar each having a flange and said flanges projecting in the same direction, a grate bar having one end supported by the top plate and including parts projecting under and closely adjacent to said flanges, and readily detachable means securing the grate bar to the top plate.

8. A grate structure comprising a grate-bar frame having a base and side walls, the latter having inclined edges of step-like form, a grate bar having side walls provided with edges adapted to fit said frame side wall edges, a grate top-plate mounted on the upper portions of said frame side walls and extending therebetween, and a retaining bar extending between lower portions of said frame side walls, said grate bar being locked by said grate bar top-plate and said retaining bar against movement in two directions.

9. An extension grate structure comprising a grate having a base and side walls, said side walls being provided with step-like edges, a grate top-plate formed to interlock with said side wall edges, a grate bar, means whereby one end of said grate bar may be detachably secured to said grate top-plate, a retaining bar carried by said base for locking the other end of said grate bar in position, and a bolt for removably securing together said grate top-plate and said frame.

10. An extension grate structure comprising a frame having a base, a grate top-plate provided with a groove forming lip portions, one of said portions having a plurality of recesses, a grate bar provided with a tongue and side wall portions, said tongue extending into said groove and said side wall portions interlocking with said recesses to prevent an undesirable displacement of said bar, and a retaining bar mounted on said base adapted to secure further said grate bar in position.

11. A grate structure comprising a grate-bar frame having a base, a grate top-plate mounted on said frame and provided with a grooved portion defining upper and lower lips, said upper lip having an aperture, a grate bar having one portion interlocking with said grooved portion and a second portion directly supported on said frame, a locking bolt for said first-mentioned grate-bar portion positioned in said aperture, a retaining bar preventing undesirable displacement of said second portion, and a bolt extending from said base for rigidly securing said grate top-plate in position.

CLIFFORD E. HARRISON.